United States Patent
Ronda et al.

(10) Patent No.: US 9,053,304 B2
(45) Date of Patent: Jun. 9, 2015

(54) METHODS AND SYSTEMS FOR USING DERIVED CREDENTIALS TO AUTHENTICATE A DEVICE ACROSS MULTIPLE PLATFORMS

(75) Inventors: Troy Jacob Ronda, Toronto (CA);
Andre Boysen, Huntsville (CA);
Abhishek Das, Mississauga (CA);
Michael Varley, Toronto (CA); Hugh Cumming, Oakville (CA)

(73) Assignee: SecureKey Technologies Inc., Toronto (CA)

( * ) Notice: Subject to any disclaimer, the term of this patent is extended or adjusted under 35 U.S.C. 154(b) by 0 days.

(21) Appl. No.: 13/548,357

(22) Filed: Jul. 13, 2012

(65) Prior Publication Data
US 2014/0020073 A1    Jan. 16, 2014

(51) Int. Cl.
G06F 15/16 (2006.01)
G06F 21/31 (2013.01)
G06F 21/34 (2013.01)

(52) U.S. Cl.
CPC .............. *G06F 21/31* (2013.01); *G06F 21/34* (2013.01)

(58) Field of Classification Search
CPC .......... G06F 21/31; G06F 21/34; H04L 63/08
USPC .......... 726/7, 26–30, 5, 9; 709/225, 229, 246; 705/50–57; 715/255
See application file for complete search history.

(56) References Cited

U.S. PATENT DOCUMENTS

| 7,698,735 | B2 | 4/2010 | Dujari et al. |
| 8,468,244 | B2 * | 6/2013 | Redlich et al. ................. 709/225 |
| 2007/0136371 | A1 * | 6/2007 | Golobay et al. ........... 707/104.1 |
| 2010/0071046 | A1 | 3/2010 | Seethana et al. |
| 2011/0099616 | A1 | 4/2011 | Mazur et al. |
| 2011/0307947 | A1 * | 12/2011 | Kariv et al. ....................... 726/9 |
| 2012/0231844 | A1 * | 9/2012 | Coppinger .................... 455/558 |
| 2013/0086670 | A1 | 4/2013 | Vangpat et al. |

FOREIGN PATENT DOCUMENTS

WO    2014008579 A1    1/2010

OTHER PUBLICATIONS

E. Hammer, Ed. et al. "The OAuth 2.0 Authorization Protocol draft-ietf-oauth-v2-23", Jan. 21, 2012, 44 pages.
Bolten, Joshua B., OMB Memorandum M-04-04, "E-Authentication Guidance for Federal Agencies", Dec. 16, 2003, 17 pages.
Burr, William E. et al. "Electronic Authentication Guideline", Computer Security Division Information Technology Laboratory, National Institute of Standards and Technology, NIST SP-80063-1, Dec. 2011.

(Continued)

Primary Examiner — Baotran N To
(74) Attorney, Agent, or Firm — Bereskin & Parr LLP/S.E.N.C.R.L., s.r.l.

(57) ABSTRACT

Methods and systems for adapting existing service provider servers to support two-factor authentication by leveraging an authentication server, which may be operated by a third party. Where a user desires to access content or services offered by a service provider server, the user may employ a client agent (for example, a web browser) in order to authenticate with the service provider server. Service provider server can redirect client agent to an authentication server to process at least a second factor or derived credential.

36 Claims, 7 Drawing Sheets

(56) References Cited

OTHER PUBLICATIONS

Wang, Rui et al., "Signing Me onto Your Accounts through Facebook and Google: a Traffic-Guided Security Study of Commercially Deployed Single-Sign-On Web Services", Proc. IEEE Symposium on Security and Privacy, May 2012, pp. 1-15.

Florencio, Dinei et al., "A Large-Scale Study of Web Password Habits", Proc. 16th International Conference on teh World Wide Web, 2007, Banff, BC.

Document relating to WO Application No. PCT/CA2013/00625, dated Sep. 23, 2013 (International Search Report).

Document relating to WO Application No. PCT/CA2013/00625, dated Sep. 23, 2013 (Written Opinion).

Document relating to WO Application No. PCT/CA2013/000625, dated Jan. 22, 2015 (IPRP).

* cited by examiner

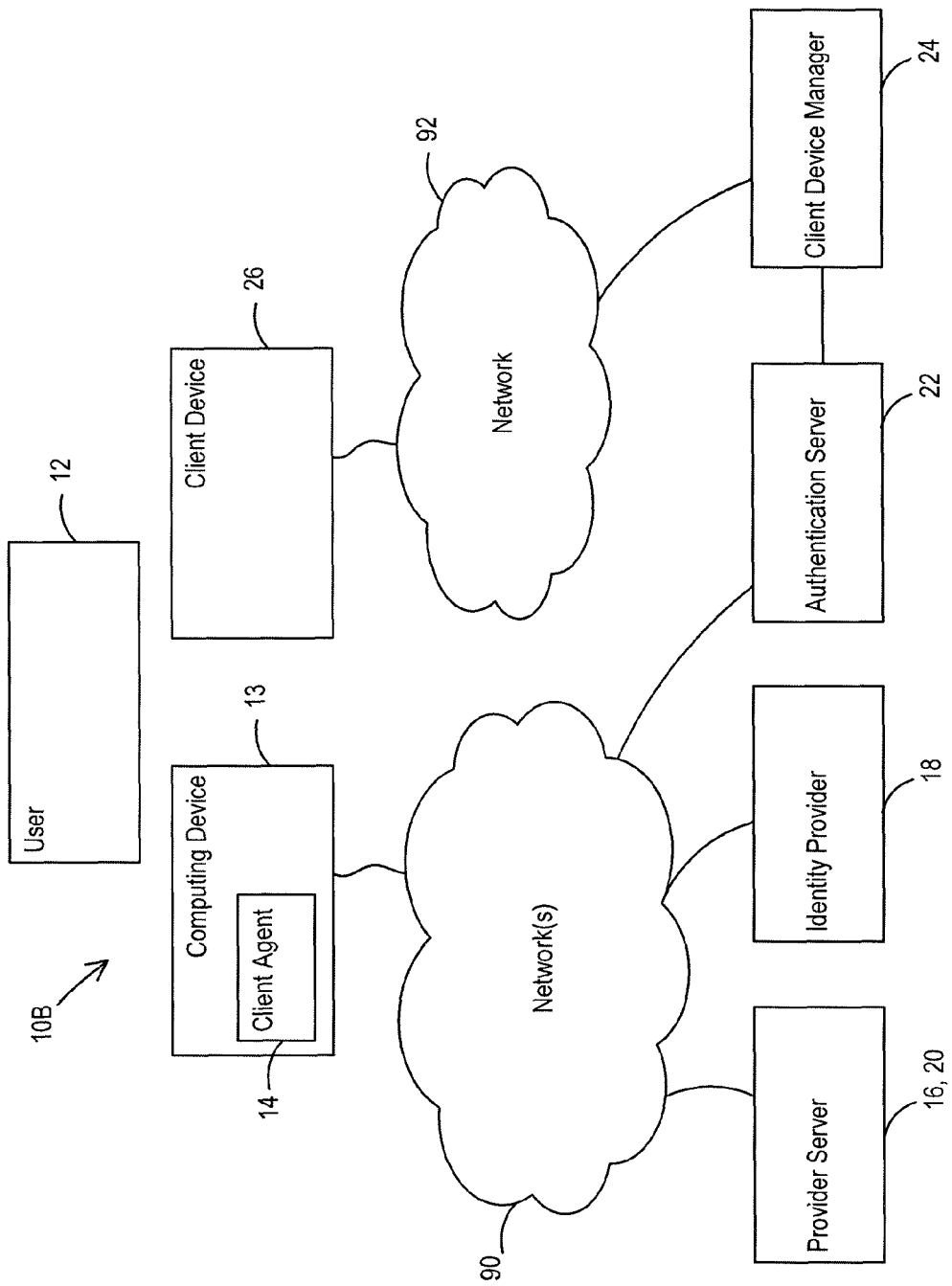

METHODS AND SYSTEMS FOR USING DERIVED CREDENTIALS TO AUTHENTICATE A DEVICE ACROSS MULTIPLE PLATFORMS

FIELD

Embodiments of the invention relate generally to system security and more particularly to a system and method for authenticating a login request received by a provider server.

INTRODUCTION

Internet users now subscribe to more online services than ever before. These online services commonly require password-based authentication to provide access to a user account. However, with an increased number of online services, many users can become frustrated with the number of passwords they must maintain. This frustration may lead users to re-use passwords or create passwords that are easy to guess. Such practices can decrease security and increase the risk of identity theft.

Some online service providers are now using two-factor authentication schemes, which may utilize a second tier of authentication in addition to password-based authentication. However, many of these schemes require the use of a different physical object or "factor" (such as a one-time password generator or a smart card). Moreover, the factor may be different for each separate online service. Accordingly, as two-factor schemes become increasingly popular, users may become as frustrated with managing second factor authentication objects, as they may be with managing a multiplicity of passwords.

SUMMARY

In a broad aspect, there is provided a method for authenticating a login request received by a provider server comprising: (a) receiving from the provider server an identity assertion request associated with the login request; (b) receiving an identity identifier for an identity associated with the identity assertion request; (c) in response to receiving the identity assertion request and the identity identifier, identifying a client device associated with the identity identifier and the provider server; and (d) sending a validation request to the client device.

The method may further comprise: receiving a validation response from the client device in response to the validation request; determining whether the validation response satisfies a validation response criterion; and if the validation response satisfies the validation response criterion, then sending a response assertion relating to the identity to the provider server.

In some cases, in response to receiving the identity assertion request and the identity identifier, and before sending the validation request, the method may further comprise: identifying a plurality of client devices associated with the identity identifier and the provider server; and receiving a selection identifying the client device from among the plurality of client devices.

In some cases, the validation request comprises a smart card cryptogram request, and the validation response comprises a smart card cryptogram generated by a smart card. In some cases, the validation request comprises a password request, and the validation response comprises a password entered at the client device. In some cases, the validation request comprises a device cryptogram request, and the validation response comprises a device cryptogram generated by the client device.

In some cases, the identity assertion request comprises a request assurance level. In some cases, the request assurance level is an OMB 04-04 assertion level.

The method may further comprise determining a type of the validation request based upon the request assurance level or based upon a provider server configuration stored in a memory.

In some cases, the response assertion comprises a response assurance level.

In some cases, the device may be identified by device identifier such as a pairing code, Quick Response (QR) code or cookie in the user agent. The device identifier may be used to determine the identity identifier.

In some cases, the identity identifier is determined based on a cookie.

In some cases, the identity identifier is received from the provider server.

In some cases, the identity identifier is received from an identity provider other than the provider server.

In some cases, the identity is a federated identity.

The method may further comprise: in response to the validation response satisfying the validation response criterion, sending a security token; and after sending the response assertion, receiving from the provider server a subsequent identity assertion request associated with a subsequent login request; after receiving the subsequent identity assertion request, receiving the security token; and after receiving the security token, sending a subsequent response assertion relating to the identity to the provider server without sending a subsequent validation request to the client device.

The method may further comprise: in response to the validation response satisfying the validation response criterion, sending a security token; and after sending the response assertion, receiving from the provider server a subsequent identity assertion request associated with a subsequent login request; after receiving the subsequent identity assertion request, receiving the security token; and after receiving the security token, determining that less than a predetermined amount of time has elapsed since sending the security token; and in response to determining that less than the predetermined amount of time has elapsed, sending a subsequent response assertion with respect to the identity to the provider server without sending a subsequent validation request to the client device.

The method may further comprise: prior to the identifying and the sending steps, receiving a request to associate the client device with the identity identifier.

In some cases, the request to associate the client device with the identity identifier further comprises a request to associate the client device with the provider server.

The method may further comprise: determining an identity proofing criterion based upon a primary credential; generating an identity proofing request for an identity proofing response that satisfies the identity proofing criterion; sending the identity proofing request; receiving the identity proofing response in response to the identity proofing request; and in response to the identity proofing response satisfying the identity proofing criterion, storing a record of the client device and the association of the client device with the identity identifier.

The method may further comprise: determining an identity proofing criterion based upon a primary credential; generating an identity proofing request for an identity proofing response that satisfies the identity proofing criterion; sending the identity proofing request; receiving the identity proofing response in response to the identity proofing request; and in response to the identity proofing response satisfying an identity proofing criterion, storing a record of the client device and the association of the client device with the provider server.

In another broad aspect, there is provided a computing device for authenticating a login request received by a provider server, the computing device comprising: a memory; and a processor communicatively coupled to the memory, the processor configured to: receive from a provider server an identity assertion request associated with the login request; receive an identity identifier for an identity associated with the identity assertion request; in response to receiving the assertion request and the identity identifier, identify a client device associated with the identity identifier and the provider server; and send a validation request to the client device.

The processor may be further configured to: receive a validation response from the client device in response to the validation request; determine whether the validation response satisfies a validation response criterion; and in response to the validation response satisfying the validation response criterion, send an response assertion with respect to the identity to the provider server.

In some cases, in response to receiving the assertion request and the identity identifier and before sending the validation request the processor is further configured to: identify a plurality of client devices associated with the identity identifier and the provider server; and receive a selection identifying the client device from among the plurality of identified client devices.

In some cases, the validation request comprises a smart card cryptogram request, and the validation response comprises a smart card cryptogram generated by a smart card. In some cases, the validation request comprises a password request, and the validation response comprises a password entered at the client device. In some cases, the validation request comprises a device cryptogram request, and the validation response comprises a device cryptogram generated by the client device.

In some cases, the identity assertion request comprises a request assurance level. In some cases, the request assurance level is an OMB 04-04 assertion level.

In some cases, the processor is further configured to determine a type of the validation request based upon the request assurance level or based upon a provider server configuration stored in the memory.

In some cases, the response assertion comprises a response assurance level.

In some cases, the identity identifier is received from the provider server. In other cases, the identity identifier is received from an identity provider other than the provider server.

In some cases, the identity is a federated identity.

In some cases, the processor is further configured to: in response to the validation response satisfying the validation response criterion, send a security token; and after sending the response assertion, receive from the provider server a subsequent identity assertion request associated with a subsequent login request; after receiving the subsequent identity assertion request, receive the security token; and after receiving the security token, send a subsequent response assertion with respect to the identity to the provider server without sending a subsequent validation request to the client device.

In some cases, the processor is further configured to: in response to the validation response satisfying the validation response criterion, send a security token; and after sending the response assertion, receive from the provider server a subsequent identity assertion request associated with a subsequent login request; after receiving the subsequent identity assertion request, receive the security token; after receiving the security token, determine whether less than a predetermined amount of time has elapsed since sending the security token; and in response to determining that less than the predetermined amount of time has elapsed, send a subsequent response assertion with respect to the identity to the provider server without sending a subsequent validation request to the client device.

In some cases, the processor is further configured to: prior to the identifying and the sending, receive a request to associate the client device with the identity identifier.

In some cases, the request to associate the client device with the identity identifier further comprises a request to associate the selected client device with the provider server.

In some cases, the processor is further configured to: determine an identity proofing criterion based upon a primary credential; generate an identity proofing request for an identity proofing response that can satisfy the identity proofing criterion; send the identity proofing request; receive the identity proofing response in response to the identity proofing request; and in response to the identity proofing response satisfying an identity proofing criterion, storing a record of the client device and the association of the client device with the identity identifier.

In some cases, the processor is further configured to: determine an identity proofing criterion based upon a primary credential; generate an identity proofing request for an identity proofing response that can satisfy the identity proofing criterion; send the identity proofing request; receive the identity proofing response in response to the identity proofing request; and in response to the identity proofing response satisfying an identity proofing criterion, storing a record of the client device and the association of the client device with the provider server.

DRAWINGS

FIG. 1B is a system block diagram in accordance with some variants of embodiments of the system of FIG. 1A;

DESCRIPTION OF VARIOUS EMBODIMENTS

Figure 1A:
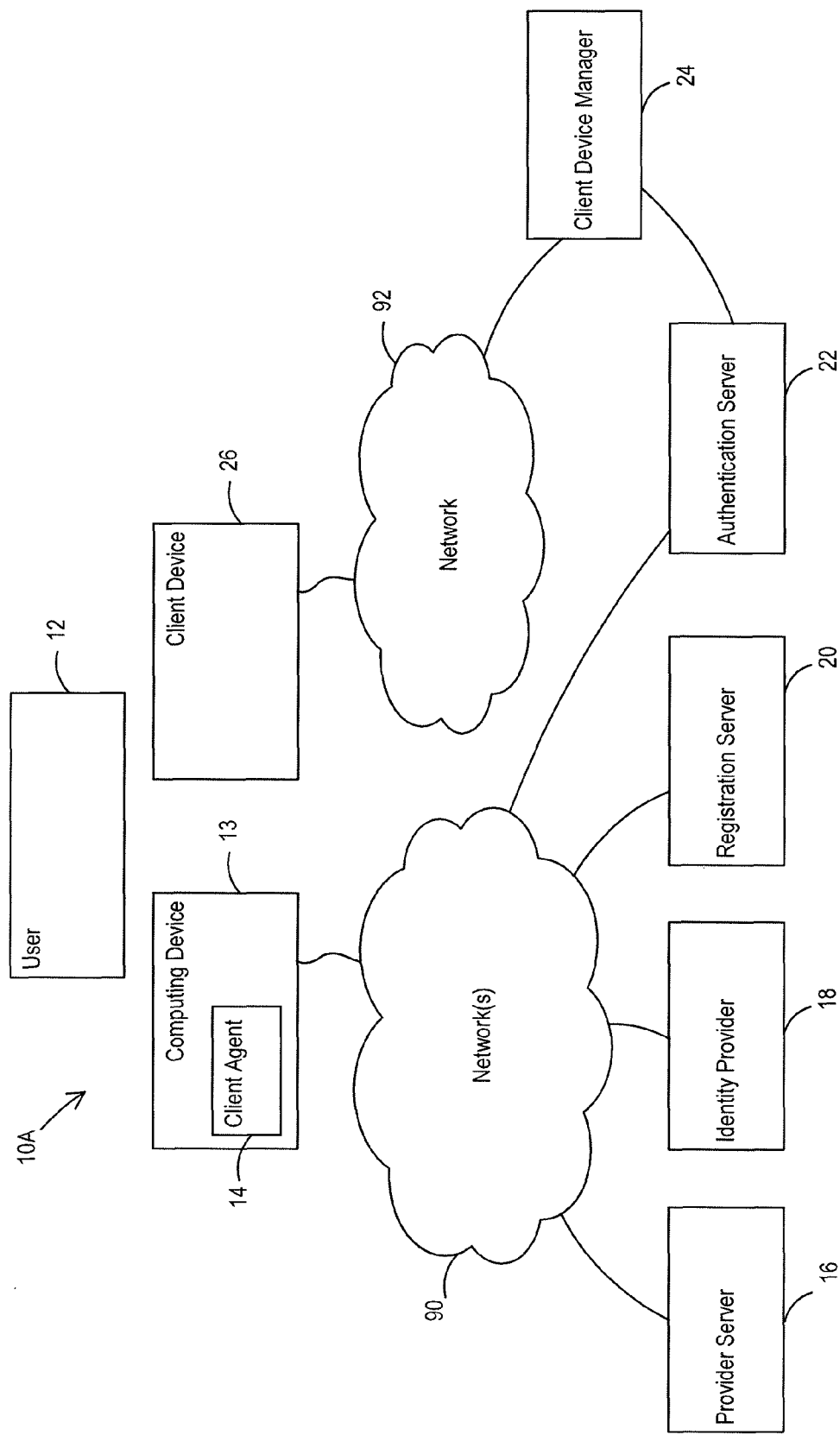
FIG. 1A is a system block diagram in accordance with some embodiments of the invention.

Referring first to FIG. 1A, there is shown a system block diagram in accordance with some embodiments of the invention. System 10A comprises a user 12, a computing device 13, a client agent 14, a provider server 16, an identity provider 18, a registration server 20, an authentication server 22, a client device manager 24 a client device 26, and networks 90, 92.

The following is an overview of the system 10A in the example shown in FIG. 1A. It is provided to give the reader with some context before describing the system elements in more detail. The user 12 may desire to access content or services offered by provider server 16. Accordingly, the user 12 may employ the client agent 14 (for example, a web browser) executing on a computing device 13 in order to authenticate with provider server 16 and take advantage of the services offered. In accordance with the embodiments described herein, provider server 16 can redirect client agent 14 to authentication server 22 to process at least a second factor credential. Accordingly, existing provider servers can be easily adapted to support two-factor authentication by leveraging authentication server 22 (which may be operated by a third party).

In some cases, client agent 14 may provide first factor credentials (e.g., username and password) directly to provider server 16. Alternatively, client agent 14 may provide first factor credentials to an identity provider 18, which may employ a federated login service, such as Facebook Connect™ or OpenID™ (a federated login service allows a single authenticated "login" to be re-used across multiple online services). In yet other embodiments, first factor credentials can be provided directly to authentication server 22. Once client agent 14 provides first factor credentials to either provider server 16 or identity provider 18, an identity identifier (such as a username) can be sent to authentication server 22. Authentication server 22 may use the identity identifier to identify an associated client device (which is associated with the identity identifier in a database, for example). The device manager 24 may send client device 26 (which may be the user's 12 cell phone or smart phone) a validation request (for example, a login confirmation request). Client device 26 sends client device manager 24 a validation response which is confirmed by authentication server 22, which in turn sends provider server 16 a reply indicating that the second factor authentication is successful. Provider server 16 then grants user 12 access to its content and/or services.

In some cases, the device may be identified by device identifier such as a pairing code, QR code or cookie in the user agent. The device identifier may be used to determine the identity identifier. In some cases, the identity identifier is determined based on a cookie.

Figure 1C:
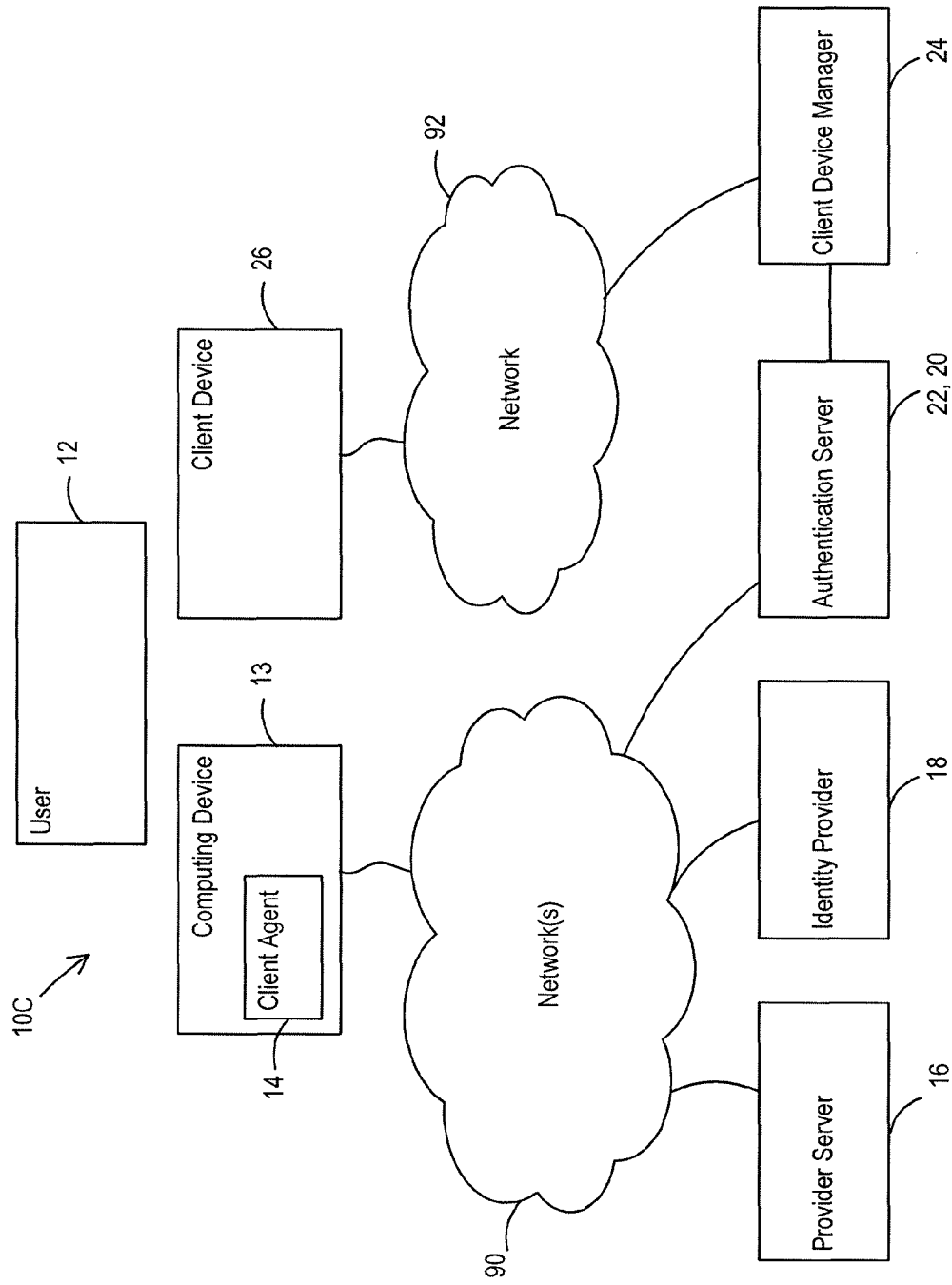
FIG. 1C is a system block diagram in accordance with some other variants of embodiments of the system of FIG. 1A.
Figure 1D:
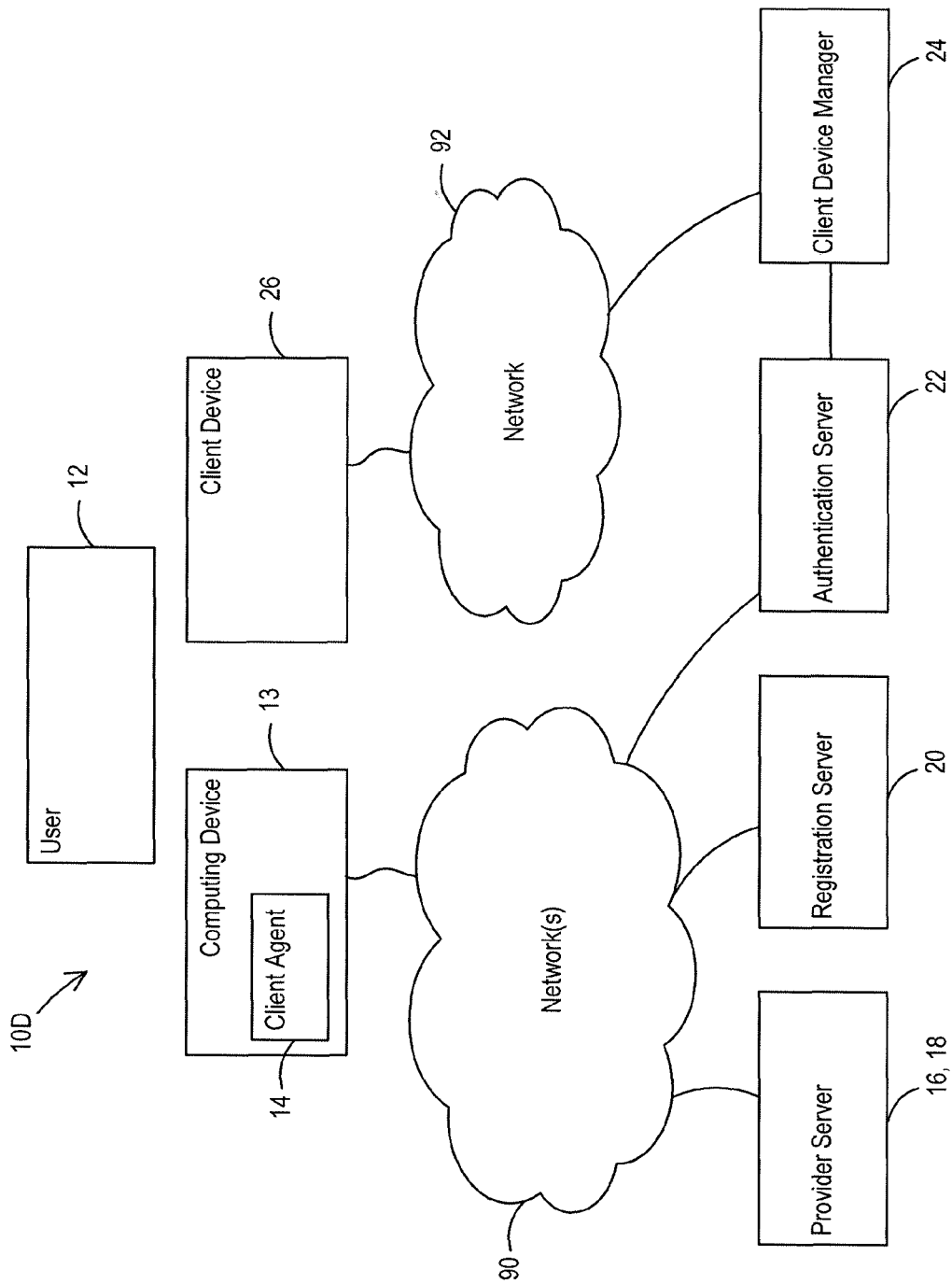
FIG. 1D is a system block diagram in accordance with yet other variants of embodiments of the system of FIG. 1A.

The system 10A will now be described in more detail with reference to FIG. 1A. Systems 10B, 10C and 10D, shown in FIGS. 1B, 1C and 1D, respectively, are generally analogous to system 10A, and like-numbered references are used to refer to similar features and components.

The components of system 10A may communicate with each other via, for example, two networks 90, 92. Networks 90, 92 may each be, for example, an internal wired network, a Virtual Private Network (VPN) or the Internet. Networks 90, 92 may be the same or different networks. In alternative embodiments, all of the components of system 10A may communicate using a single network (not shown), such as the Internet. In yet other alternative embodiments, the system 10A may utilize more than two networks (not shown). For example, network 90 may be replaced by a first network for communication between provider server 16 and authentication server 22, and a second network for communication between identity provider 18 and authentication server 22. In this example, provider server 16 may not be connected with the second network, and identity provider 18 may not be connected with the first network.

Provider server 16 can be a networked resource configured to provide one or more users with content and/or services. Provider server 16 may be implemented in software, hardware or a combination of both. Exemplary provider servers may include banking websites, self-service kiosks, social networking websites (e.g., Facebook™), video streaming services (e.g., Netflix™), online discussion forums, automated banking machines, point of sale machines, virtual private network (VPN) systems, and video game servers. Other exemplary provider servers include enterprise servers such as Virtual Private Network (VPN) and Office® 365; government services kiosks; health care access; etc.

Figure 4:
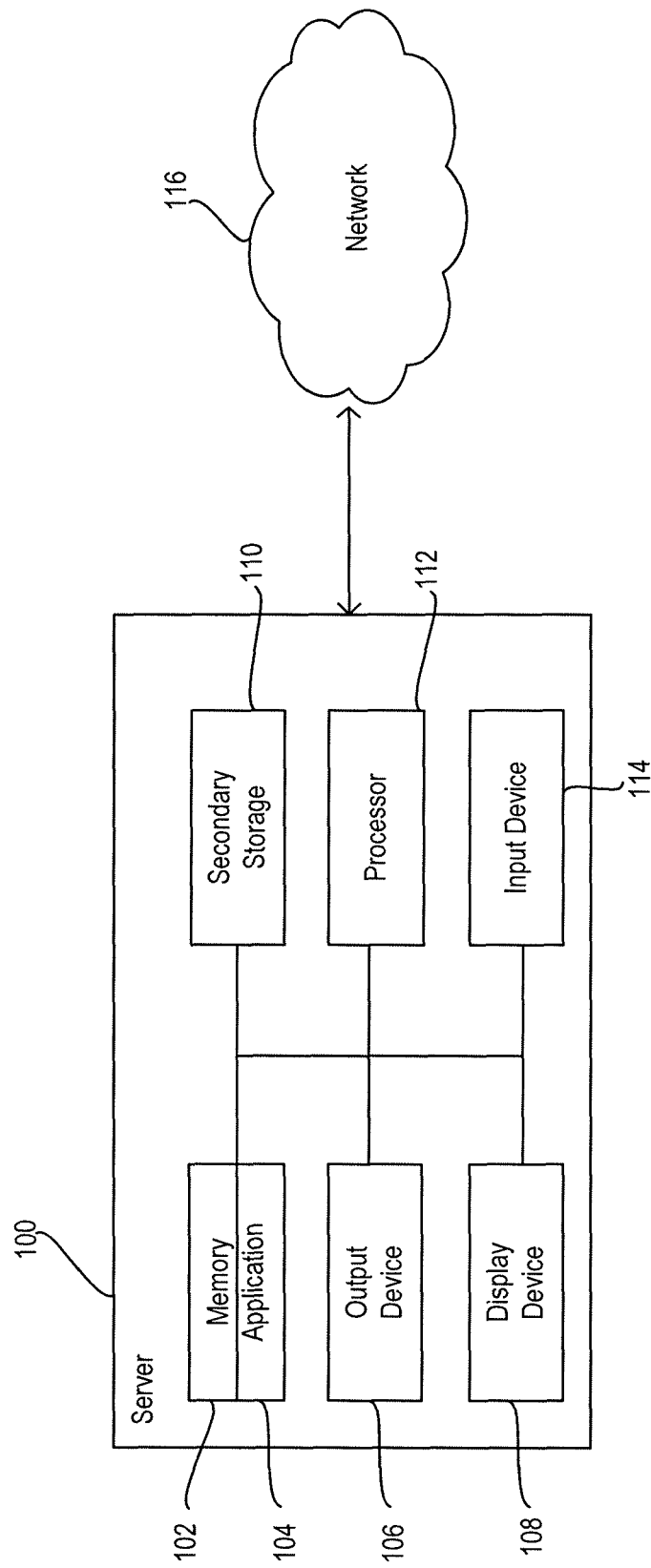
FIG. 4 is an example schematic of a server.

FIG. 4 shows an example of a server 100. Server 100 generally illustrates hardware components that may be used by one or more other components of systems 10A to 10D, such as provider server 16, identity provider 18, registration server 20, authentication server 22 and device manager 24. Server 100 may include a connection with a network 116 such as wired or wireless connection to the Internet or other type of computer or telecommunication networks, which may correspond with the networks 90, 92 shown in FIGS. 1A to 1D. Server 100 may include one or more of a memory 102, a secondary storage device 110, a processor 112, an input device 114, a display device 108, and an output device 106.

Memory 102 may include random access memory (RAM) or similar types of memory, and it may store one or more applications 104 for execution by processor 112. Applications 104 may correspond with software modules comprising computer executable instructions to perform processing for the functions described below. Secondary storage device 110 may include a hard disk drive, floppy disk drive, CD drive, DVD drive, Blu-ray drive, or other types of non-volatile data storage. Processor 112 may execute applications, computer readable instructions or programs stored in memory 102 or secondary storage 110, or received from the Internet or other network 116. Input device 114 may include any device for entering information into server 100, such as a keyboard, key pad, cursor-control device, touch-screen, camera, or microphone. Display device 108 may include any type of device for presenting visual information such as, for example, a computer monitor, flat-screen display, projector or display panel. Output device 106 may include any type of device for presenting a hard copy of information, such as a printer, and may also include other types of output devices such as speakers, for example. In some cases, server 100 may include multiple of any one or more of processors, applications, software modules, second storage devices, network connections, input devices, output devices, and display devices.

Although server 100 is depicted with various components, one skilled in the art will appreciate that this server may in some cases contain additional or different components. In addition, although aspects of an implementation of server 100 may be described as being stored in memory, one skilled in the art will appreciate that these aspects can also be stored on or read from other types of computer program products or computer-readable media, such as secondary storage devices, including hard disks, floppy disks, or CDs, DVDs; a carrier wave from the Internet or other network; or other forms of RAM or ROM. The computer-readable media may include instructions for controlling server 100 and/or processor 112 to perform a particular method.

Provider server 16 may store one or more user accounts in a memory. For example, provider server 16 may provide a database stored in the memory, for storing the one or more user accounts. Each user account may be associated with an identity identifier (e.g., a username, user identification number, etc.). Provider server 16 may associate a user account with services and/or content accessible to that user account. Accordingly, provider server 16 may provide such services and/or content to a user that can establish or authenticate the identity represented by the identity identifier. For example, a banking service may associate an identity identifier with a particular bank account, and may allow a user to manage funds in the bank account upon successfully authenticating his or her identity.

A user's identity may be comprised of a collection of "claims" or items of information associated with that user. For example, a user identity may comprise:

Full Name: John Smith
Address: 123 Queen Street, Toronto, Ontario, Canada
Phone Number: 416-555-5555
Email address: john.smith@example.com
Username: jsmith When a user desires to access content or services offered by provider server 16, the user may be required to submit a login request via client agent 14. The login request may be accompanied by one or more items of information associated with the user's identity. In some other cases, provider server 16 may request such information in response to the login request (e.g., via a login web page) user 12. In some cases, provider server 16 may permit a user to prove or authenticate the claimed identity using only a first factor credential. For example, provider server 16 may provide a login screen in response to a login request in which a user can enter an identity identifier (e.g., a username) and a first factor credential (e.g., a password). Provider server 16 may be configured to process any one or more of a plurality of first factor credentials, which may comprise for example:

- passwords, either static or generated
- personal identification numbers (PINs)
- credit card verification value (CVV) numbers
- biometric imprints (e.g., fingerprint, palm or retina scan)
- biometric cards (e.g., based on EMV, PIV or other suitable standards)
- personal security questions
- smart card cryptograms Once the claims associated with the login request (e.g., identity identifier and first factor credential) are received, provider server 16 can generate and send an identity assertion request comprising the claims to authentication server 22. Authentication server 22 may process the identity assertion request, verify one or more of the claims (e.g., whether first factor credential is correct) and generate an identity assertion response. An identity assertion response may be a statement from a verifier (e.g., authentication server 22) to a relying party (e.g., provider server 16) about an identity (e.g., provided by user 12). An identity assertion response may comprise verified claims (e.g., a telephone number or address that has been independently verified as being associated with the user 12).

Provider server 16 may also send the client identity identifier (e.g., username), associated with the login request, to authentication server 22, for example, if provider server 16 has processed the first factor credential. Alternatively, provider server 16 may not send a client identity identifier to authentication server 22, and instead authentication server 22 may process a first factor credential (and capture an identity identifier), in which case a subsequent response assertion from authentication server 22 may comprise the identity identifier associated with the login request.

Authentication server 22 is configured to receive identity assertion requests from one or more provider servers (such as provider server 16, in response to a login request at provider server 16), verify the identity assertion requests, and to respond to the requests with identity assertion responses indicating whether authentication is successful or not. Authentication server 22 may be a computer server implemented in software, hardware or a combination of software and hardware, as shown and described in relation to FIG. 4.

In some cases, authentication server 22 may respond to an identity assertion request with an identity assertion response, after processing at least one second factor credential. Authentication server 22 may be configured to receive identity assertion requests from a plurality of provider servers (such as provider server 16) and may be located remotely from provider servers, in which case communication may take place via a network such as the Internet. In some cases, authentication server 22 may be configured to receive identity assertion requests from a single provider server 16.

In cases where provider server 16 does not send authentication server 22 an identity identifier, the authentication server 22 may be configured to store identity identifiers in a database and to process a first factor credential without receiving an identity identifier from provider server 16. Alternatively, authentication server 22 may be configured to receive an identity identifier associated with a login request from the identity provider 18. The identity provider 18 may be a server distinct from the provider server 16, and can process the first factor credential on behalf of provider server 16.

Authentication server 22 may also be configured to process a second factor credential that is derived from a different credential—that is, a second factor derived credential—prior to sending an identity assertion response to provider server 16. In some cases, a second factor derived credential may be received by authentication server 22 as part of a validation response from the client device 26. Furthermore, authentication server 22 may be configured to register a client device (such as client device 26) from which a validation response may be received in the future. The registration of the client device 26 may involve independent verification of identity (identity proofing) via the registration server 20. The processing of second factor derived credentials, and the registration of client devices is described in more detail below.

Identity provider 18 may be configured to receive an identity assertion request and to reply with an identity assertion response, which may comprise an identity identifier and/or identity claims. In some cases, the identity provider 18 may be configured to process a first factor credential (e.g., password) and to reply with an identity assertion response comprising one or more of an identity identifier and identity claims.

For example, authentication server 22 may be configured to redirect client agent 14 to identity provider 18. After user 12 provides a first factor credential to identity provider 18 via client agent 14, identity provider 18 may provide authentication server 22 with an identity identifier, associated with the login request at provider server 16. Examples of the identity provider 18 comprise federated login services such as those provided by Facebook™ and Google™, and private directory services accessed or provided via protocols such as Security Assertion Markup Language (SAML), Active Directory Federation Services (ADFS), Lightweight Directory Access Protocol (LDAP) and Remote Authentication Dial In User Service (RADIUS). Identity provider 18 may be implemented in software, hardware or a combination of software and hardware. In some cases, identity provider 18 may be combined with provider server 16 (as shown in exemplary system 10D of FIG. 1D).

Registration server 20 may be used to provide independent verification of identity (identity proofing). Registration server 20 may be implemented in software, hardware or a combination of software and hardware as shown and described with reference to FIG. 4 above. In some cases, registration server 20 may be a third party server configured to receive identity proofing requests from authentication server 22. In other cases, the functionality of registration server 20 may be provided by provider server 16 (as shown in exemplary system 10B of FIG. 1B) or by authentication server 22 (as shown in exemplary system 10C of FIG. 1C).

Generally, identity proofing may comprise determining an identity proofing criterion (e.g., a smart card cryptogram) based upon a primary credential (e.g., a smart card in the possession of user 12); generating an identity proofing request (e.g., a smart card cryptogram request) for an identity proofing response that can satisfy the identity proofing criterion; sending the identity proofing request (e.g., to client device 26); receiving an identity proofing response (e.g., a smart card cryptogram generated by the smart card) in response to the identity proofing request and determining if the identity proofing response satisfies the identity proofing criterion. In some cases, a primary credential may comprise one or more of: passwords; personal identification numbers (PINs); credit card verification value (CVV) numbers; biometric imprints (e.g., fingerprint, palm or retina scan); or personal security questions.

In addition, or as an alternative to, to smart card cryptogram verification, identity proofing may comprise one or more of, for example: sending a code or passphrase to a street address (e.g., for later validation); sending a code or passphrase in a short message service (SMS) message or voice message to a telephone number (e.g., for later validation); requesting a pre-shared secret, an answer to a personal verification question (e.g., for later validation), or a voice print; and verifying a cryptographic device associated to a user (e.g., an integrated circuit card, a smart card, or a hardware one-time password generator (e.g., for sending future identity proofing requests).

Client device 26 be configured to receive validation requests from authentication server 22 (or via client device manager 24) and to send a validation response in reply. Validation requests may be used to verify that a user attempting to authenticate with the provider server is in possession of a registered device (e.g., client device 26) or a second factor derived credential (which may be provided by or via client device 26).

Client device 26 may be, for example, a computing device such as a smart phone, a personal computer, a Universal Serial Bus (USB) device, a tablet, a mouse, a keyboard, a service kiosk, a Bluetooth™ accessory (e.g., a Bluetooth™-enabled card reader), a NFC reader (which may in some cases be connected to another device via Bluetooth™) or a television. Client device 26 may comprise, for example, a processor, a memory (e.g., which may comprise volatile memory, non-volatile memory, or both), input devices and output devices (e.g., a display, a speaker, etc.). Examples of input devices comprised in client device 26 include a keypad or keyboard, touchpad, camera, microphone, and a smart card reader. Input devices may be connected via wired (e.g., Universal Serial Bus) or wireless interfaces (e.g., Bluetooth™ or NFC). Client device 26 comprises at least one network interface, such as wired or wireless connection to the Internet or other type of computer or telecommunication networks, which may correspond with the networks 90, 92 shown in FIGS. 1A to 1D. The memory may store software application modules comprising computer executable instructions to perform processing for the functions described below. The processor may execute software application modules. It will be appreciated that in some cases client device 26 may comprise additional or different components.

Client device 26 is generally capable of processing validation requests from authentication server 22. For example, client device 26 may be configured to receive a smart card cryptogram request, transmit the request to a smart card reader that is locally connected (or integrated) with client device 26, receive a smart card cryptogram generated by a smart card (which may be encrypted), and transmit the (encrypted) smart card cryptogram in response to the smart card cryptogram request. In another example, client device 26 may be configured to receive a password request, receive a password input via a user interface provided at client device 26, and transmit the password (preferably in encrypted form) to authentication server 22. In another example, client device 26 may be configured to receive a code entered by a user via the user interface, where the code may be communicated to the user via automated voice communication to a phone number by authentication server 22. In still another example, a one-time code may be generated at the client device 26 (e.g., for login or transaction confirmation) and entered by the user via the user interface, which may be used if network connectivity is not available, for example. In some cases, client device 26 may be configured to process a validation request using one or more of: a hardware or software cryptogram generator; a user interface for obtaining a password (e.g., operated via a touch screen, hardware keyboard or other input device); a near field communication (NFC) reader; a biometric reader (e.g., for capturing a fingerprint, or palm imprint); a global positioning system (GPS) module; a camera (e.g., for capturing a QR code; and a microphone. The validation request may be processed using a dedicated software application module, or an embedded module in another software application module (e.g., an embedded authentication window).

In some cases where lower assurance levels are needed, the client agent verification may comprise browser fingerprinting, the use of cookies, or both.

Client agent 14 may be configured to act on behalf of the user 12. For example, user 12 may interact with client agent 14, instructing client agent 14 to communicate with one or more of provider server 16, identity provider 18, registration server 20, and authentication server 22. Client agent 14 is generally implemented in software executed by a computing device, although an all hardware implementation may also be used. For example, client agent 14 may be a web browser, or software executed by an automated banking machine, a self-service kiosk, or a point of sale device. Depending on the protocols used (e.g., Web Single Sign-On protocols, such as Security Assertion Markup Language (SAML), OAuth, OpenID and Web Services Federation (WS-Federation)), client agent 14 may be configured to transmit one or more of identity claims, identity identifiers, and identity assertions between one or more of the provider server 16, identity provider 18, registration server 20, and authentication server 22.

Figure 2:
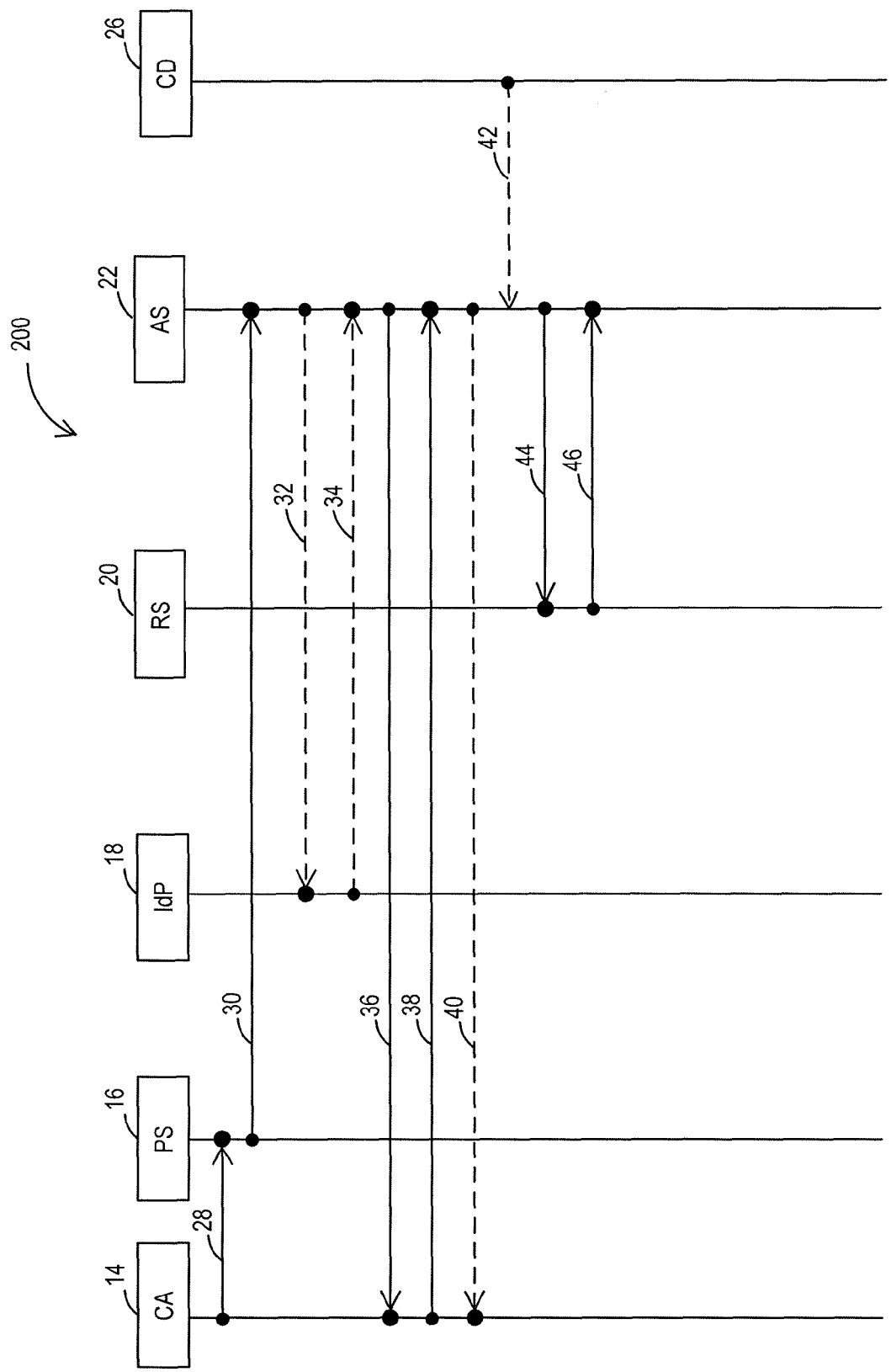
FIG. 2 is a sequence diagram for registering a client device in accordance with embodiments of the invention.

Referring now to FIG. 2, there is illustrated an exemplary process 200, for registering a client device in accordance with an exemplary embodiment of the invention. In the example shown, the sequence starts at 28 when a user 12, directs client agent 14 to attempt login, or otherwise access the services and/or content of provider server 16. For example, user 12 may select a login request via a login web page associated with provider server 16, and client agent 14 may generate and transmit the appropriate login request.

At step 30, provider server 16 generates and sends an identity assertion request, associated with the login request, to authentication server 22. In some cases, some or even all of the communication between provider server 16 and authentication server 22 may be exchanged via intermediaries. For example, provider server 16 and authentication server 22 may exchange content and messages via client agent 14 (in which case the exchanged content and messages may be encrypted). In some cases, provider server 16 may forward or redirect client agent 14 to authentication server 22 (e.g., to a web page hosted by authentication server 22).

Provider server 16 may also send an identity identifier, associated with the login request, to authentication server 22 if, for example, provider server 16 has collected the identity identifier. In some cases, the provider server 16 may accept a cookie, or another security token provided by client agent 14, in satisfaction of the first factor credential and/or instead of an identity identifier.

In some cases, provider server 16 may also identify itself to authentication server 22, for example by sending a provider server identifier and one or more credentials. Alternatively, authentication server 22 may identify provider server 16 by detecting the source of the received identity assertion request.

Provider server 16 may also determine and send an assurance level request associated with the identity assertion request to authentication server 22. Generally, an assurance level represents how stringent the identity proofing and validation protocols must be. That is, each assurance level describes a varying degree of confidence that the user presenting a credential is in fact that user represented by the credential. The U.S. Office of Management and Budget (OMB) has defined four assurance levels in OMB 04-04, with level 1 being the lowest level of assurance and level 4 being the highest level of assurance. The National Institute of Standards and Technology (NIST) has defined specifications for these four assurance levels in a table in publication number NIST SP 800-63. The entire contents of OMB 04-04 and NIST SP 800-63 are incorporated herein by reference. In other cases, authentication server 22 may understand and accept any number of custom assurance levels in addition to the four NIST assurance levels. The assurance level request may be transmitted as part of the identity assertion request. When using SAML, for example, a custom level of assurance (LOA) may be defined as a URN (e.g., com:company:service: loa1) or URL (e.g., http://service.company.com/loa1). This URN or URL can then be passed in the SAML request in the Authentication Context, and the server can be configured to respond to this request.

The types of identity proofing and validation requests may be based upon the assurance level request from provider server 16 (if provided). For example, authentication server 22 may follow one or more identity proofing and validation request protocols where each protocol may be associated with and satisfies one or more assurance levels. The protocols may comprise one or more prescribed types identity proofing and/or validation request which satisfy the associated assurance level(s). In some cases, the provider server 16 may store the identity proofing and validation protocols in a memory at authentication server 22, or the protocols may be transmitted by provider server 16 with each identity assertion request.

At step 32, authentication server 22 may optionally send a request to identity provider 18 for an identity identifier. Authentication server 22 may send the request where, for example, provider server 16 has not processed a first factor credential, and/or provider server 16 has not provided an identity identifier. Identity provider 18 may be configured to receive a first factor credential from user 12 (via client agent 14) and return an identity identifier, associated with the login request at provider server 16, to authentication server 22.

In some cases, provider server 16 may request that authentication server 22 identify which identity providers may be used to retrieve identity identifiers associated with identity assertion requests received from provider server 16. A provider server's preference for certain identity identifiers may be stored in a memory at authentication server 22. Alternatively, provider server 16 may send this preference to authentication server 22 with each identity assertion request.

Authentication server 22 (or client device manager 24) may be configured to store (e.g., in a memory or database) client device records, which may comprise indications of provider servers and associated identity identifiers.

For example, after receiving an identity identifier, authentication server 22 may locate one or more corresponding client device records that are associated with the identity identifier, as well as provider server 16. At step 36, authentication server 22 may send user 12 (via client agent 14) a list of zero or more located client devices, and a request for either a selection of a client device from among the identified list, or for a selection to register a new device. The process that follows the selection of one of the identified devices will be described in more detail below.

Continuing to refer to FIG. 2, at step 38 client agent 14 may send authentication server 22 a selection to register a new client device. In some cases, authentication server 22 may identify and send client agent 14 a list of client devices that are associated with the received identity identifier but not associated with provider server 16. These client devices may be known to authentication server 22 (e.g., stored in a client device database) and thus already available to associate with provider server 16. In this case, client agent 14 may optionally send a request to associate one of the listed client devices or may choose to associate a new, previously unknown, client device.

If client agent 14 sends a selection to register a new client device 26, then client device 26 may simply identify itself to authentication server 22 in association with the present registration session. Client device 26 may be configured to identify itself in any suitable way. For example, authentication server 22 may, at step 40, send a session code to client agent 14 and user 12 may enter the session code into a software application module at client device 26 via client agent 14. The software application module at client device 26 may be designed to receive the code and contact authentication server 22. Accordingly, at step 42, the application module may send this session code to authentication server 22 thus identifying the client device to authentication server 22 in association with the present registration session. In some cases, client device 26 may send to authentication server 22 a device cryptogram, a unique device identifier (UDID), or some other identifier.

Once client device 26 is associated with the identity identifier, it may itself be considered a derived credential (such as a second factor derived credential) or it may be used to facilitate communication of other derived credentials. Generally, a derived credential is a credential issued based upon a previously issued primary credential. Therefore, after new client device 26 is identified and before client device 26 is associated with the identity identifier, the possession and/or authentication of one or more primary credentials may be established using an identity proofing process. Generally, the identity proofing can be performed by registration server 20. As discussed above, the functionality of registration server 20 may instead be performed by authentication server 22 or provider server 16.

At step 44, authentication server 22 may send an identity assertion request to registration server 20. The request may comprise the identity identifier (with which registration server 20 may look up the corresponding identity), or one or more of the claims, which comprise the identity (e.g., a telephone number, address, cryptogram). The request may also comprise the assertion level, or an identity proofing protocol to be followed.

An identity proofing criterion may be determined by any one or more of registration server 20, authentication server 22 or provider server 16. For example, authentication server 22 may send to registration server 20 the telephone number which forms part of the identity identified by the identity identifier, as well as instructions to place a telephone call to that number to communicate, for example, a 10 character alphanumeric code. In practice, the size of the code may vary as needed and may incorporate other types of characters (e.g., punctuation). In this example, the identity proofing criterion may be that the received identity proofing response must comprise a matching 10 character code. For example, registration server 20 may place an automated voice call to the received phone number, play a voice message communicating a security code meeting the prescribed requirements (where the voice message is intended to be heard by user 12), and subsequently request that security code from client agent 14 (where the code can be input by the user 12 who has heard the voice message into client agent 14). Optionally, a voiceprint of the user receiving the automated voice call may be requested and stored (e.g., at authentication server 22) for subsequent confirmation (e.g., in the event that the transaction is disputed). If client agent 14 sends the correct code to registration server 20, then registration server 20 may then send, at step 46, an identity assertion to authentication server 22 that reports that the authentication was successful. Registration server 20 may also send to authentication server 22 a message that the assurance level that was met by the completed protocols.

Registration server 20 (or any system component incorporating the functionality of registration server 20) may conduct identity proofing in other suitable ways (which satisfy the requested assurance level, if provided). For example, in some cases, identity proofing may comprise the registration server 20 or the client device manager 24 sending the client device 26 a request for a smart card cryptogram. In some cases, identity proofing may comprise the registration server 20 requesting a code that was printed on paper and mailed to the street address comprising the identity. In some cases, identity proofing may comprise depositing funds into a bank account associated with the identity and requesting the exact amounts so deposited. In some cases, identity proofing may comprise responding to predetermined personal challenge questions, providing credit card verification (CVV) codes, providing credit card verification using an authorization amount, user address verification. Other techniques for establishing identity may also be used, as will be known.

Identity proofing may comprise a protocol including any one or more of these and other suitable identity proofing methods.

In general, identify proofing provides a mechanism by which the presence of a user, and in some cases the identity of the user, may be verified by a third party (e.g., authentication server, registration server, provider server, etc.).

After a successful identity proofing, the authentication server 22 (or client device manager 24) can store a client device record for client device 26 (e.g., a UDID validated by a device cryptogram, etc.) in a memory, along with the association between the client device 26 and the identity (or the identity identifier) and the provider server 16. The login procedure may then proceed as described herein.

The registration process 200 may in some cases be modified to occur outside of the context of a login request. For example, authentication server 22 may be configured to receive a client device registration request without an identity assertion request. For example, the user 12 (via client agent 14) may wish to pre-register one or more client devices with authentication server 22. The user 12 may later send a request to associate the pre-registered client device with a provider server 16 in the context of a subsequent login request. At this time, additional identity proofing may or may not be required.

Figure 3:
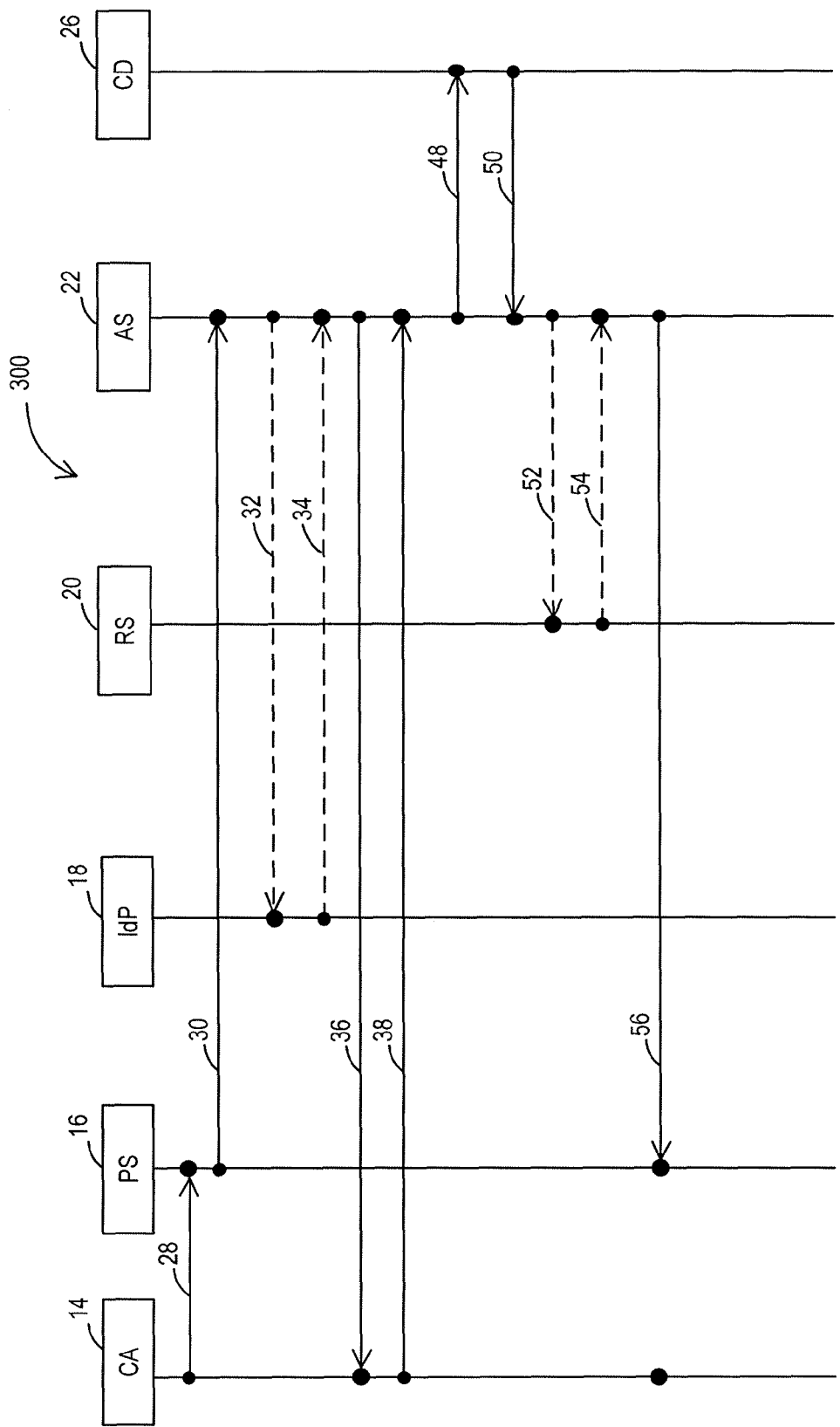
FIG. 3 is a sequence diagram for logging into a provider server in accordance with embodiments of the invention.

Referring now to FIG. 3, there is illustrated an exemplary process 300 for logging into a provider server in accordance with at least some embodiments of the invention. In the example shown, the login sequence may begin in similar fashion to the client device registration sequence 200 described with reference to FIG. 2. In particular, steps 28, 30, 32, 34 and 36 in process 300 of FIG. 3 may generally correspond to like numbered steps of FIG. 2. The user 12 (or client agent 14) sends a client device selection identifying a client device associated with provider server 16 and the identity identifier to authentication server 22. The selected client device may be client device 26, for example.

At step 48, the authentication server 22 (via client device manager 24) may send one or more validation requests to client device 26. In some cases, the validation request(s) may comprise information about the transaction for which validation is requested. For example, the validation request may comprise one or more of: the IP address of the client agent 14; the current date/time; the date/time of the last login attempt; the geo-location of client agent 14 or provider server 16; the name or address of the provider server 16; and the reason for the action request (e.g., authorize purchase, authorize sign-on).

Authentication server 22 may determine the type of validation request(s) to send based upon an assurance level received from the provider server 16 at 30. For example, authentication server 22 may follow one of a plurality of validation protocols where each protocol is associated with and satisfies one or more assurance levels. In some cases, authentication server 22 may identify and follow a validation protocol which satisfies the assurance level received from identity provider server 16. Each protocol may comprise one or more validation requests or types of validation requests which satisfy the associated assurance level(s).

In some cases, the authentication server 22 may store one or more validation protocols. In some cases, provider server 16 may send a validation protocol to authentication server 22 with each identity assertion request. A validation protocol may comprise one or more validation requests or types of validation requests to be performed. Example validation requests may comprise a request for: a password; a PIN; a credit card CVV number; a biometric imprint (e.g., fingerprint, palm or retina scan); biometric cards (e.g., based on EMV, PIV or other similar standards); an answer to a personal security question; a smart card cryptogram; and a device cryptogram.

For example, a validation protocol for an assurance level associated with an assurance level may require a PIN and a smart card cryptogram. In this example, the selected client device 26 may be configured to receive a PIN, and read a smart card cryptogram generated by a smart card. For example, the client device 26 may be a cellular phone equipped with a keypad and user interface for receiving a PIN number entered by a user, and a smart card reader for reading a smart card cryptogram generated by a smart card.

An assurance level and/or provider server 16 preferences may require additional identity proofing at steps 52, 54. In some cases, provider server 16 may request additional identity proofing if a predetermined period has elapsed since the last identity proofing was performed. In other cases, provider server 16 may specify that additional identity proofing is always required for transactions of a certain character (e.g., the transfer or withdrawal of money). The additional identity proofing may be more or less stringent than the identity proofing performed during client device registration.

At step 56, authentication server 22 sends to provider server 16 an identity assertion response indicating whether the authentication was successful. Generally, the identity assertion response comprises an identity identifier that is known to provider server 16. In some cases, authentication server 22 also sends to provider server 16 a response assurance level that was satisfied by the validation and/or identity proofing protocols. The response assurance level may be higher, lower or equal to the request assurance level sent to authentication server 22 with the identity assertion request. Authentication server 22 preferably attempts to at least meet the request assurance level. However, in some cases (e.g., where user 12 does not have a client device 26 registered which can satisfy the required assurance level), authentication server 22 may follow a protocol satisfying a lesser assurance level. Provider server 16 may determine the appropriate action to take when it receives a response identity assertion with a response assurance level that is lesser than the request assurance level. For example, provider server 16 may deny a login request or may accept the login request. In some cases, if assurance level is lesser than the request assurance level, combining with the client device authentication can also supplement the assurance level based on configuration and policy.

The process 300 may be modified to be performed outside of the context of a login request. For example, subsequent to a completed login by user 12 at provider server 16 using a first credential, provider server 16 may send an identity assertion request to authenticate an important transaction (e.g., a transfer or withdrawal of money). This may be referred to as a "step-up" authentication.

Similarly, the process 300 may be modified to be repeated to authenticate an important action or transaction. For example, after a user successfully logs into provider server 16 using the sequence steps of process 300, provider server 16 may send an additional identity assertion request to authenticate an important transaction (e.g., a transfer or withdrawal of money). Optionally, the authentication server 22 may skip identifying and requesting a client device, and instead immediately send the validation request to the same client device 26 identified during the initial login. The provider server 16 may send information about the transaction (e.g., time, date, IP address of user 12, transaction details) to the authentication server 22 for sending to the client device 26.

In some cases, the authentication server 22 may create secondary derived credentials, such as a security token. After a successful identity proofing and/or after a successful validation, authentication server 22 may issue a secondary derived credential (e.g., a security token, cookie, etc.) to client agent 14. The secondary derived credential may be received by the authentication server 22 in lieu of a validation response from client device 26. For example, after receiving an identity assertion request, authentication server 22 may request a security token from client agent 14. If client agent 14 sends a valid security token, then authentication server 22 may issue an identity assertion to provider server 16 indicating that authentication was successful, even though no validation request was sent and no validation response was received.

In some cases, a secondary derived credential, such as the aforementioned security token, may be associated with a provider server and/or a security device. For example, a new security token may be issued to client agent 14 with each successful identity proofing and/or validation for each provider server and/or each client device. In this example, a security token will only be considered acceptable in lieu of validation if it is used in association with the corresponding provider service, and/or client device.

Identity provider 18 may also be configured to issue and accept certain types of second factor derived credentials (e.g., security tokens) in lieu of the user entering a first factor credential. For example, an identity provider 18 (e.g., Facebook™) may automatically send an identity identifier to authentication server 22 at 34, without requiring a first factor credential, if the client agent 14 sends a valid security token.

The issuance and acceptability of secondary derived credentials by authentication server 22 and identity provider 18 in substitution for validation protocols and first factor credentials may be limited by policies set by authentication server 22 or provider server 16. For example, a policy may prohibit the use of a secondary derived credential if more than a predetermined period of time has elapsed since a validation protocol was completed or since a first factor credential was provided. In another example, a policy may disallow the use of a secondary derived credential for any transaction that meets certain criteria (e.g., transactions flagged as potentially fraudulent or important transactions such as the withdrawal of money). Some provider servers 16 or authentication servers 22 may disallow the use of secondary derived credentials altogether. Provider server 16 may be configured to send specific directions not to accept secondary derived credentials with each identity assertion request.

Communication Security

In some cases, the identity assertion request is sent via a client agent redirect. Communication between the components of the system (e.g., systems 10A to 10D) and the client agent 14 may be secured using suitable any cryptographic protocols, such as Transport Layer Security (TLS). Likewise, web services communication between the provider server 16 and the authentication server 22 can be secured using Hypertext Transfer Protocol Secure (HTTPS) or some other suitable protocol.

The provider server 16 may use Web Single Sign On (Web-SSO) authentication schemes such as SAML, OAuth, OpenID, and WS-Federation to communicate with the authentication server 22. For example, this may be appropriate when a web-based provider server 16 delegates authentication to the authentication server 22.

The provider server 16 may also communicate with the authentication server 22 using a JavaScript Object Notation (JSON) Application Programming Interface (API) protected by OAuth 2, for example. In this case, the provider server 16 may embed an Hypertext Markup Language (HTML) inline frame (IFrame) directed to a universal resource locator (URL) provided by an authentication server API, which allows the authentication server 22 to display user interface messages to the user 12 via client agent 14. In yet other cases, the provider server may be allowed to display the user interface by, for example, being provided JavaScript libraries and APIs enabling access to the data to be displayed (e.g., similar to the use of an IFrame to display UI data). Examples of the user interface data to be displayed include the list of identity providers and/or devices. In another case, when the client agent and client device are the same device, the client agent can start the client device software by employing protocol handlers or client agent plugins, for example.

In some cases, the provider server may leverage an existing RADIUS based authentication system (for example, for virtual private network (VPN) or Wireless Access Point authentication). RADIUS is typically run over user datagram protocol (UDP), and therefore it is generally secured either by internal RADIUS security schemes (shared password, for example) or by protecting the network link (using private VPN, for example). The authentication server 22 may be configured to provide one-time passwords to the provider server 16 for authentication.

Identity providers 18 may provide identity claims and/or identity identifiers using a standard claims protocol such as, for example, SAML, OAuth, OpenID, WS-Federation, and Kerberos. Hypertext Transfer Protocol (HTTP, web services) communication between the identity provider 18 and the authentication server 22 may be secured over Secure Socket Layer (SSL) v3.0 or better. The identity provider 18 may be authenticated with an HTTP-Basic or HTTP-Digest Authentication scheme or better.

For added security, identity claims and/or identity identifiers sent by identity provider 18 may be digitally signed. The identity provider 18 may also be configured to communicate with authentication server 22 via client agent 14 using a WebSSO protocol.

Communications between the registration server 20 and the client agent 14 may be secured over SSLv3 or better. HTTP (web services) communication between the registration server 20 and the authentication server 22 may be secured over SSL v3.0 or better. The registration server 20 and the authentication server 22 may be authenticated with an HTTP-Basic or HTTP-Digest Authentication scheme or better.

The registration server 20 may use a WebSSO authentication scheme such as SAML, OAuth, OpenID, and WS-Federation, for example, to communicate with the authentication server 22. This may be particularly appropriate when performing web-based identity proofing, for example.

Generally, communication between the authentication server 22 and the client device manager 24 may occur over a local private network. Communications between authentication server 22 and client device manager 24 may be protected from the general Internet by firewalls and other network security methods. In cases, where the client device manager web services interface is exposed to provider server 16, then HTTP protection mechanisms such as TLS, and HTTP-Basic Authentication may be used. In some cases, client device manager 24 may use OAuth Authentication (e.g., OAuth v2.0).

Similarly, a Web Services interface between the client device 26 and client device manager 24 can be secured with TLS. In some cases, X.509 client certificates may be used for added security.

In some cases, the client device 26 may comprise a secure element running secure software (e.g., a smart card and reader) for communicating with the client device manager 24. In these and other embodiments, the client device manager 24 may communicate with the client device over a secure Global Platform Secure Channel Protocol 3 (SCP-03) secured channel through a TLS (HTTPS) tunnel, or over a TLS connection directly, for example.

In some cases, client device manager 24 may be configured to provide push notifications to client device 26 occur over public third party systems (for example, Apple™ Push Notifications, Extensible Messaging and Presence Protocol (XMPP), Google™ Cloud to Device Messaging (C2DM), RIM Blackberry™ Push Service, or Amazon™ Simple Notification Service). In some cases, only non-sensitive information is provided in push notifications. Alternatively, client device manager 24 may not provide push notifications over public third party systems to minimize the risk of exposing vulnerable session information, in which case an application module at client device 26 may be initiated manually by the user (e.g., by launching a software application) and the module may query a client device manager 24 to determine if one or more transactions is pending.

Provider server 16 may be verified a variety of ways. For example, verifying provider server 16 may comprise a simple shared secret sent over a secure channel such as HTTP-Basic Authentication. A more secure verification scheme may comprise the use of X.509 client certificates for the TLS connection. In another example, the provider server may be granted limited access to a select Internet Protocol (IP) address pool or may communicate over an established VPN connection.

The data integrity of the identity claims and/or identity identifiers and/or identity assertions sent by the identity provider 18 and/or the registration server 20 may be strengthened using digital signature schemes (e.g., RSA, Elliptic Curve Cryptography (ECC), or Hash-based Message Authentication Code (HMAC)) in some cases. For example, an entire claim (comprised of a string of bytes) can be modified using one or more of these algorithms (along with the keys) to obtain a "signature" string of bytes, which is appended to the message. The receiver can take the claim string, run it though the same algorithm with the (public or shared) key and compare the "signature" strings to ensure they agree.

In some embodiments, a client device may be configured to provide a cryptogram to prove its identity. Accordingly, a client device may be configured with a software or hardware cryptogram generator. A hardware cryptogram generator may be configured to run on an applet in a secure element in some client devices. A secure element is a protected computing environment (e.g., smart cards, UICC, embedded secure element chips). Some devices may employ a less protected environment such as a Trusted Execution Environment (TEE) or may lack a hardware secure element altogether. In general, shared secrets and private keys are stored within the secure element and cryptographic algorithms associated with the keys may also be executed within the secure element. A hardware generated cryptogram may provide for increased security, because the private key(s) used are stored in a special hardware chip (*secure element?) that is not generally accessible to the host operating system of the client device and therefore less vulnerable to malware. Authentication server 22 may verify a client device's cryptogram using a corresponding cryptographic key. In some embodiments, a cryptogram may be generated according to the Open Authentication (OATH) standards group. For example, a cryptogram may be generated using Hash-based Message Authentication Code (HMAC)-based One Time Password (HOTP), Time-based One Time Password (TOTP), Global Platform Secure Channel Protocol (SCP) 03, OATH Challenge Response Algorithms (OCRA), Europay-MasterCard-VISA (EMV) algorithms, or the like.

EXAMPLES

For the purposes of illustration, several exemplary embodiments will now be described with reference to specific implementation scenarios.

In a first scenario, an online game server may require that players protect their account with a 'what you have' credential. The user 12 has previously registered a username and password, vetted with an existing e-mail address. The game system (i.e. provider server 16) authenticates the user 12 with their existing username and password via a web page, and then redirects the user's web browser to the authentication server 22 to register the user's client device 26. The authentication server 22 completes the registration process (as described in more detail above), and conducts identity proofing by sending a one-time code to the client's registered email address (supplied by the game system 16). Once verified, the authentication server 22 associates the client device 26 with the provider server 16 and the username. Accordingly, the client device 26 may be considered as a derived credential, wherein the credential is derived from the email address. Subsequently, authentication system can return an identity assertion response to the game system 16.

On subsequent logins, the game system 16 collects the client's password credential, and request an identity assertion from the authentication system 22, which sends a notification to the client device 26 for login confirmation. In this example, the game system 16 may consider an out-of-band token to be sufficient, so the user 12 can simply confirm the login request on the client device 26, for example by reviewing the displayed transaction context information from the notification and selecting an "accept" button. In response to selection of the accept button, the client device can transmit a response to the authentication server 22, which can return an identity assertion response confirming the authentication along with an identifier (e.g., username) to the game system 16. Accordingly, the game system 16 can log the user in.

In this example, if the user wishes to add a new client device as a derived credential, they would generally again authenticate with their username and password and go through the client device registration process.

In another scenario, an online government service (i.e. provider server 16) protects its citizens from fraudulent access by requiring a 'what you have' authentication factor that is issued by a central authority such as a government agency. Accordingly, the government can issue its citizens with identification cards. The identification cards may be smart cards with near field communication (NFC) and cryptogram generation capabilities. Separately, the government can send citizens a passcode via postal mail to their primary residence.

In this scenario, to register a client device as a derived credential for use with government services, the user 12 must first associate a username- and password-based identity credential. In this example, the authentication server 22 may direct user 12 to login using a federated login service 18 that meets the government's requirements (e.g., stored in a configuration in a memory at authentication server 22). The authentication server 22 may then send a validation request to a client device 26 chosen by user 12. In this example, the validation request comprises a request for a smart card cryptogram generated specifically by the government issued smart card. The user 12 can satisfy the validation request by reading the government issued smart card with the client device 26 (e.g., via the client device's equipped near field communication (NFC) reader). In this example, the client device 26 collects a cryptogram from the government issued smart card, transmits the cryptogram to the authentication server 22, and then redirects the user 12 back to the online government service (in this example representing a combination of content provider server 16 and registration server 20) to supply the passcode sent by postal mail. If the passcode and the smart card cryptogram are valid, the authentication server 22 stores a client device record for the client device 26 associated with the online government service 16 and the identity credential (from federated login server 18).

On further logins into the online government service 16, the user 12 can be redirected to the authentication server 22, where the user can be directed to supply his/her username and password credential to the federated login service 18. The authentication server 22 can then send to the client device 26 a validation request including context information such as the time of day, IP address, geographic location and the service provider name. In this example, the validation request is a request for a device cryptogram along with the client's action of confirming the request (e.g., selecting an accept button). When the user 12 provides input accepting the requested action by the authentication server on the client device 26, the client device 26 generates a device cryptogram (which may differ from the smart card cryptogram), and the confirmation and device cryptogram are sent to the authentication server 22. The authentication server 22 verifies the device cryptogram and the confirmation and, if they are valid, authentication server 22 returns an identity assertion response indicating a successful authentication along with the identity credential to the online government service.

In this example, the online government service (i.e. provider server 16 or registration server 20) may require that identity proofing be repeated for all users 12 (i.e. that the government issued smart cards need to be re-verified) if more than one month has passed since the last successful authentication or identity proofing. Accordingly, the next time the user 12 logs into the online government service, the user 12 will be requested to transmit the smart card cryptogram to the authentication server 22 using the NFC reader on the client device 26. If the smart card cryptogram is valid, then an identity assertion indicating a successful authentication along with the identity credential are sent to the online government service 16.

In a further scenario, a bank server implementing an online banking website (i.e. provider server 16) protects its customers from fraudulent activity by requiring a 'what you have' authentication factor (e.g., physical key device), but does not wish to inconvenience users during every login action by requiring actual use of the physical key device. In this example, the second authentication factor and/or transaction confirmation is only required for certain actions on an account, like transferring an amount greater than $1000. This may be referred to as step-up authentication, or assurance level escalation.

In this example, the bank server processes the username and password authentication factor. In order for the user 12 to register the client device 26 to the user's account, the user 12 must complete identity proofing. In this example, identity proofing comprises a request for a valid credit card number that is associated with the user's account and a request for answers to one or more personal verification questions. The authentication server 22 may use the bank server as the registration server 20 to verify the credit card number and the personal verification questions. If the credit card number is correct and the personal verification questions are answered correctly, then the authentication server 22 stores a client device record for client device 26 and associates it to the bank server and the particular account or identity identifier.

When the user 12 subsequently logs in to bank server to view the user's account, the user may only need to supply his/her username/password credentials to the bank 16. However, if the user 12 then attempts to transfer $5000 to an offshore account, the bank 16 may redirect the user 12 to the authentication server 22, which sends a validation request to the client device 26 along with the money transfer details. If user 12 uses the client device 26 to confirm the transaction, then the client device 26 will send to the authentication server 22 the confirmation along with a device cryptogram generated by the client device 26. If authentication server 22 can verify that the device cryptogram is valid, then authentication server 22 may send an identity assertion indicating a successful authentication along with an account identifier to the bank server. The bank server may then allow the money transfer to proceed.

In a variant of the above example, the bank server may require transaction confirmation instead of using step-up confirmation. In this variant, the bank server may send an identity assertion request to the authentication server 22 when the user first logs in. Later during the same session with bank server, the user 12 may be required to re-authenticate with authentication server 22 in response to a transaction request (e.g., the user 12 requests a transfer of money). In this example, the bank server may send an additional identity assertion request to authentication server 22, and this additional identity assertion request may or may not be accompanied with instructions that identity proofing must be redone.

In a further scenario, a company wishes to protect its VPN system (i.e. provider server 16 implements the VPN system in this example) with a 'what you have' authentication factor, without having to integrate with an existing hardware OTP vendor and distribute expensive hardware. In this scenario, the company may configure their VPN system to collect a SAML v2 assertion from the authentication server 22. The company allows employees 12 to identify themselves against the company active directory federation services server (ADFS) with their enterprise credentials (an example of identity provider 18). The authentication server 22 is configured to redirect employees 12 to the ADFS to identify themselves and provide a first factor credential. The authentication server 22 is also configured to send validation requests to the client devices 26 of employees 12. An employee's client device 26 may be their private mobile smart phone, or tablet personal computer (PC), or a universal serial bus (USB) dongle with a secure element, for example. In any case, in this example, the client device 26 does not need to be issued by the employer. Instead employees 12 can register their client devices 26 using the authentication server 22 after completing identity proofing. Identity proofing in this case may comprise an automated one-time-code exchange over a public switched telephone network (public switched telephone network (PSTN)) voice call to the employee's work desk phone.

When an employee 12 subsequently logs in to the VPN system, the VPN system sends a SAML v2 assertion request to the authentication server 22. The authentication server 22 then sends a request to the company's ADFS system 18 for an identity identifier. After the employee 12 authenticates with the company's ADFS system 18, the authentication server 22 receives an identity identifier for the employee 12. Next, the authentication server 22 looks up a record of client device 26 associated with the identity identifier and the VPN system, and then sends that client device 26 a validation request. In this example, the client device 26 sends a request to the client device manager for session context information (e.g., last login time, client IP address, geo-location information etc.) and displays this information. The employee 12 first reviews the session context information and then selects an 'accept' button on the client device 26. This causes the client device 26 to generate and send a device cryptogram, which is subsequently verified by the authentication server 22. If the device cryptogram is valid then the authentication server 22 sends the VPN system a SAML v2 response assertion indicating that the authentication was successful. The VPN system may then grant the employee 12 access to the VPN system.

In a variant of the above example, the process may be modified for a legacy system (the provider server implements 16 implements the legacy system in this example) that rely on the RADIUS protocol for authentication (such as a point-to-point tunneling protocol (PPTP) VPN server, for example). In this variant, instead of a SAML request, the legacy system may request a TOTP (time based one-time password) from the authentication server 22 for the specific employee 12. The authentication server 22 may then validate the TOTP using a secure data store of shared secret keys maintained for each of the company's employees 12. If the TOTP is valid, then the authentication server 22 would generate and return the TOTP to the RADIUS server via the legacy system. The RADIUS server could then verify the TOTP and grant access to the employee 12.

In a further scenario, an online service (i.e. provider server 16) leverages federated login services 18 (e.g., Facebook™ or Google™, for example) while strengthening the authentication process with a 'what you have' authentication factor. In this example, the online service does not issue or manage any identity proofing credentials, and therefore relies on the authentication server 22 entirely for identity proofing.

During registration, a new user 12 is requested to register client device 26 in association with a federated login and the online service. The identity proofing protocol may comprise one or more of a phone call, SMS message, contactless card, email message, and challenge questions. The user 12 may provide some of the information used to generate the identity proofing protocol (e.g., a phone number).

On subsequent logins, the user 12 is redirected to authentication server 22 and asked to provide their federated login credentials and use their client device 26 to reply to a validation request.

If the user 12 later attempts to register a new client device 26, then the user 12 may be asked to repeat the identity proofing process, this time using the same protocol used previously (e.g., an SMS may be sent to the same phone number).

In a further scenario, a financial card issuer (i.e. provider server 16) wishes to protect issuance of a credit card to a customer's NFC-enabled client device (26) (e.g., their mobile phone) using the authentication server (22). That is, before loading a "virtual" credit card into a mobile device (e.g., in a mobile wallet solution), a financial institution may wish to strongly authenticate the user and ensure they possess the corresponding physical credit card (e.g., the credit card can produce a cryptogram that can be verified by the issuer to ensure that the credit card belonging to the user is physically present). The financial card issuer may also wish to create a derived credential using the customer's client device (26) at the same time.

The client agent 14 authenticates to the financial card issuer 16 with their username/password authentication factor, provides their credit card number and answers to challenge questions to the issuer. Accordingly, the client device can be bound to the financial institution's account as a derived credential, with the primary credential being the credit card. In addition to the NFC-enabled client device 16 becoming bound using the authentication server 22, the issuer can also request the appropriate TSM (trusted services manager) to load the presented financial card into the NFC-enabled client device 26. TSM is a service used to provision secure credentials onto mobile devices (e.g., load the "virtual" card as a mobile wallet credential). In some cases, a TSM is a third party trusted by both the credit card issuer and the device manufacturer or network provider. Once the virtual credit card is loaded into the mobile wallet (e.g., Google Wallet or ISIS Wallet), it can be used with a suitable client device. For example, if the client device supports NFC, the device may be placed in a card emulation mode, and an RF-enabled POS (e.g., PayWave™ or PayPass™) can communicate with the phone in a similar manner to a chip-enabled credit card. Accordingly, the NFC-enabled client device can be bound as a derived credential at the same time as the "virtual" card is loaded onto the device. In some cases, a credit card issuer may use alternative or additional techniques, such as SMS verification, to authorize the loading of the credential via the TSM.

The embodiments described herein have been presented for the purposes of illustration and are not intended to be exhaustive or limiting. Many variations and modifications are possible in light of the foregoing teachings. The invention is limited only by the following claims.

The invention claimed is:

1. A method of authenticating a login request received by a provider server from a client agent, the method comprising:
   receiving from the provider server an identity assertion request associated with the login request;
   receiving an identity identifier for an identity associated with the identity assertion request;
   in response to receiving the identity assertion request and the identity identifier, identifying a client device separate from the client agent and associated with the identity identifier and the provider server;
   sending a validation request to the client device;
   receiving a validation response from the client device in response to the validation request; and
   sending a response assertion relating to the identity to the provider server, the method further comprising:
   prior to the identifying and the sending steps, receiving a request to associate the client device with the identity identifier;
   determining an identity proofing criterion based upon a primary credential;
   generating an identity proofing request for an identity proofing response that satisfies the identity proofing criterion;
   sending the identity proofing request;
   receiving the identity proofing response in response to the identity proofing request; and
   in response to the identity proofing response satisfying the identity proofing criterion, storing a record of the client device and the association of the client device with the identity identifier.

2. The method of claim 1, further comprising:
   determining whether the validation response satisfies a validation response criterion before sending the response assertion.

3. The method of claim 1, wherein, in response to receiving the identity assertion request and the identity identifier, and before sending the validation request, further comprising:
   identifying a plurality of client devices associated with the identity identifier and the provider server; and
   receiving a selection from the client agent identifying the client device from among the plurality of client devices.

4. The method of claim 2, wherein the validation request comprises a smart card cryptogram request, and wherein the validation response comprises a smart card cryptogram generated by a smart card.

5. The method of claim 2, wherein the validation request comprises a password request, and the validation response comprises a password entered at the client device.

6. The method of claim 2, wherein the validation request comprises a device cryptogram request, and wherein the validation response comprises a device cryptogram generated by the client device.

7. The method of claim 1, wherein the identity assertion request comprises a request assurance level.

8. The method of claim 7, wherein the request assurance level is an Office of Management and Budget 04-04 assertion level.

9. The method of claim 7, further comprising determining a type of the validation request based upon the request assurance level.

10. The method of claim 1, further comprising determining a type of the validation request based upon a provider server configuration stored in a memory.

11. The method of claim 2, wherein the response assertion comprises a response assurance level.

12. The method of claim 1, wherein the identity identifier is received from the provider server.

13. The method of claim 1, wherein the identity identifier is received from an identity provider other than the provider server.

14. The method of claim 1, wherein the identity is a federated identity.

15. The method of claim 2, further comprising:
   in response to the validation response satisfying the validation response criterion, sending a security token; and
   after sending the response assertion, receiving from the provider server a subsequent identity assertion request associated with a subsequent login request;
   after receiving the subsequent identity assertion request, receiving the security token; and
   after receiving the security token, sending a subsequent response assertion relating to the identity to the provider server without sending a subsequent validation request to the client device.

16. The method of claim 2, further comprising:
   in response to the validation response satisfying the validation response criterion, sending a security token; and
   after sending the response assertion, receiving from the provider server a subsequent identity assertion request associated with a subsequent login request;
   after receiving the subsequent identity assertion request, receiving the security token; and
   after receiving the security token, determining that less than a predetermined amount of time has elapsed since sending the security token; and
   in response to determining that less than the predetermined amount of time has elapsed, sending a subsequent response assertion with respect to the identity to the provider server without sending a subsequent validation request to the client device.

17. The method of claim 1, wherein the request to associate the client device with the identity identifier further comprises a request to associate the client device with the provider server.

18. The method of claim 1, wherein the storing comprises storing the record of the client device and the association of the client device with the provider server.

19. A computing device for authenticating a login request received by a provider server from a client agent, the computing device comprising:
   a memory; and
   a processor communicatively coupled to the memory, the processor configured to:
   receive from a provider server an identity assertion request associated with the login request;
   receive an identity identifier for an identity associated with the identity assertion request;
   in response to receiving the assertion request and the identity identifier, identify a client device separate from the client agent and associated with the identity identifier and the provider server;
   send a validation request to the client device;
   receive a validation response from the client device in response to the validation request; and
   send a response assertion relating to the identity to the provider server, wherein the processor is further configured to:

prior to the identifying and the sending, receive a request to associate the client device with the identity identifier;

determine an identity proofing criterion based upon a primary credential;

generate an identity proofing request for an identity proofing response that can satisfy the identity proofing criterion;

send the identity proofing request;

receive the identity proofing response in response to the identity proofing request; and in response to the identity proofing response satisfying an identity proofing criterion, storing a record of the client device and the association of the client device with the identity identifier.

20. The computing device of claim 19, wherein the processor is further configured to:

determine whether the validation response satisfies a validation response criterion before sending the response assertion.

21. The computing device of claim 19, wherein in response to receiving the assertion request and the identity identifier and before sending the validation request the processor is further configured to:

identify a plurality of client devices associated with the identity identifier and the provider server; and receive a selection from the client agent identifying the client device from among the plurality of identified client devices.

22. The computing device of claim 20, wherein the validation request comprises a smart card cryptogram request, and wherein the validation response comprises a smart card cryptogram generated by a smart card.

23. The computing device of claim 20, wherein the validation request comprises a password request, and the validation response comprises a password entered at the client device.

24. The computing device of claim 20, wherein the validation request comprises a device cryptogram request, and wherein the validation response comprises a device cryptogram generated by the client device.

25. The computing device of claim 19, wherein the identity assertion request comprises a request assurance level.

26. The computing device of claim 25, wherein the request assurance level is an Office of Management and Budget 04-04 assertion level.

27. The computing device of claim 25 wherein the processor is further configured to determine a type of the validation request based upon the request assurance level.

28. The computing device of claim 19, wherein the processor is further configured to determine a type of the validation request based upon a provider server configuration stored in the memory.

29. The computing device of claim 20, wherein the response assertion comprises a response assurance level.

30. The computing device of claim 19, wherein the identity identifier is received from the provider server.

31. The computing device of claim 19, wherein the identity identifier is received from an identity provider other than the provider server.

32. The computing device of claim 19, wherein the identity is a federated identity.

33. The computing device of claim 20, wherein the processor is further configured to:

in response to the validation response satisfying the validation response criterion, send a security token; and after sending the response assertion, receive from the provider server a subsequent identity assertion request associated with a subsequent login request;

after receiving the subsequent identity assertion request, receive the security token; and after receiving the security token, send a subsequent response assertion with respect to the identity to the provider server without sending a subsequent validation request to the client device.

34. The computing device of claim 20, wherein the processor is further configured to:

in response to the validation response satisfying the validation response criterion, send a security token; and after sending the response assertion, receive from the provider server a subsequent identity assertion request associated with a subsequent login request;

after receiving the subsequent identity assertion request, receive the security token;

after receiving the security token, determine whether less than a predetermined amount of time has elapsed since sending the security token; and in response to determining that less than the predetermined amount of time has elapsed, send a subsequent response assertion with respect to the identity to the provider server without sending a subsequent validation request to the client device.

35. The computing device of claim 19, wherein the request to associate the client device with the identity identifier further comprises a request to associate the selected client device with the provider server.

36. The computing device of claim 19, wherein the processor is further configured to store the record of the client device and the association of the client device with the provider server.

* * * * *